United States Patent
Oh et al.

(10) Patent No.: US 8,755,146 B1
(45) Date of Patent: Jun. 17, 2014

(54) SPINDLE MOTOR AND HARD DISK DRIVE INCLUDING THE SAME

(71) Applicant: Samsung Electro-Mechanics Co., Ltd., Suwon (KR)

(72) Inventors: Song Bon Oh, Suwon (KR); Kwan Soo Yun, Suwon (KR); Kum Kyung Lee, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/835,520

(22) Filed: Mar. 15, 2013

(30) Foreign Application Priority Data

Dec. 20, 2012 (KR) .......................... 10-2012-0149147

(51) Int. Cl.
*G11B 5/48* (2006.01)

(52) U.S. Cl.
USPC ...................................... 360/99.08

(58) Field of Classification Search
CPC ...... G11B 5/48; G11B 19/20; G11B 19/2009; H02K 5/02; H02K 5/225; H02K 5/16; H02K 5/165
USPC ................. 360/99.08, 99.16, 99.13; 310/425; 384/107
See application file for complete search history.

(56) References Cited

U.S. PATENT DOCUMENTS

| 2009/0140587 | A1 | 6/2009 | Popov et al. |
| 2009/0284866 | A1* | 11/2009 | Ito et al. ..................... 360/99.08 |
| 2010/0239194 | A1* | 9/2010 | Kodama ........................ 384/107 |
| 2011/0304937 | A1 | 12/2011 | Kang |
| 2013/0120868 | A1 | 5/2013 | Mizukami et al. |
| 2013/0235489 | A1* | 9/2013 | Aoshima ..................... 360/99.08 |
| 2014/0009040 | A1* | 1/2014 | Song et al. .................... 310/425 |

FOREIGN PATENT DOCUMENTS

| JP | 2000-60064 | 2/2000 |
| JP | 2009-136143 | 6/2009 |
| KR | 10-2011-0136443 | 12/2011 |
| KR | 10-2012-0022546 | 3/2012 |

OTHER PUBLICATIONS

Korean Office Action mailed Dec. 24, 2013 in corresponding Korean Application 10-2012-0149147.

* cited by examiner

*Primary Examiner* — Allen T Cao

(57) ABSTRACT

There is provided a spindle motor, including: a shaft having a fixing groove formed in a lower portion thereof; a lower thrust member including a fixing part inserted into the fixing groove, a disk part extending from the fixing part in an outer radial direction, and an extension part extending from the disk part in an axial direction; a base member coupled to the extension part; a rotating member forming a bearing clearance with the shaft and rotatably provided with respect to the shaft; a first sealing part provided between an upper surface of the extension part and the rotating member; and a second sealing part provided between an inner circumferential surface of the base member and an outer circumferential surface of the rotating member.

18 Claims, 5 Drawing Sheets

SPINDLE MOTOR AND HARD DISK DRIVE INCLUDING THE SAME

CROSS-REFERENCE TO RELATED APPLICATIONS

This application claims the priority of Korean Patent Application No. 10-2012-0149147 filed on Dec. 20, 2012, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

An information recording reproducing apparatus, such as a hard disk driving apparatus, may be provided with a so-called fixed shaft spindle motor in which a shaft with strong vibration resistance is fixed to a case of a hard disk driving apparatus.

That is, a spindle motor mounted in the hard disk driving apparatus may adopt a structure in which a shaft is fixed, so as to prevent a state in which recorded information may be damaged and may not be written or read due to external vibrations.

Meanwhile, as the spindle motor used in the hard disk drive apparatus requires a high degree of reliability, there is a need to keep quantity of a lubricating fluid filling a hydrodynamic bearing assembly including a fixed shaft.

When the lubricating fluid is separated from a liquid-vapor interface formed between the lubricating fluid and air due to an external impact, vibrations, and the like, and leaked to the outside, the rotational characteristics of the spindle motor may be deteriorated and a rotating member and a fixed member forming a bearing clearance may be worn due to lack of the lubricating fluid.

Therefore, a need exists for the development of a structure capable of preventing the lubricating fluid from leaking to the outside.

SUMMARY OF THE INVENTION

An aspect of the present invention provides a spindle motor capable of preventing foreign objects from being introduced from the outside and a lubricating fluid from leaking, by significantly increasing a labyrinth sealing effect, and a hard disk drive including the same.

Further, another aspect of the present invention provides a spindle motor having improved lifespan and performance, and a hard disk drive including the same.

According to an aspect of the present invention, there is provided a spindle motor, including: a shaft having a fixing groove formed in a lower portion thereof; a lower thrust member including a fixing part inserted into the fixing groove, a disk part extending from the fixing part in an outer radial direction, and an extension part extending from the disk part in an axial direction; a base member coupled to the extension part; a rotating member forming a bearing clearance with the shaft and rotatably provided with respect to the shaft; a first sealing part provided between an upper surface of the extension part and the rotating member; and a second sealing part provided between an inner circumferential surface of the base member and an outer circumferential surface of the rotating member.

The first sealing part may be inclined upwardly in an inner radial direction.

At least one of the upper surface of the extension part and a surface of the rotating member opposed to the upper surface of the extension part may be inclined upwardly in an inner radial direction.

A first liquid-vapor interface may be formed between an inner circumferential surface of the extension part and the outer circumferential surface of the rotating member.

A first space may be formed above the first liquid-vapor interface in the axial direction.

The first space may be increased upwardly in the axial direction.

A second space may be formed between the first sealing part and the second sealing part.

A volume of the second space may be smaller than that of the first space.

An end portion of the upper surface of the extension part in the outer radial direction may be provided with a step part recessed downwardly in the axial direction.

The base member may include a body part; and a coupling part extending upwardly from the body part in the axial direction and coupled to the extension part.

The second sealing part may be formed between an inner circumferential surface of the coupling part and the rotating member.

A surface of the rotating member opposed to the inner circumferential surface of the coupling part may be disposed in an inner radial direction with respect to an outer circumferential surface of the extension part.

An upper surface of the coupling part may be disposed above the upper surface of the extension part in the axial direction.

An upper portion of the shaft may be provided with a flange part extending in the outer radial direction, and a second liquid-vapor interface may be formed between an outer circumferential surface of the flange part and a surface of the rotating member opposed to the outer circumferential surface of the flange part.

At least one of the outer circumferential surface of the flange part and the surface of the rotating member opposed to the outer circumferential surface of the flange part may be tapered.

The spindle motor may further include a cover part fixed to one of an upper surface of the flange part and an upper surface of the rotating member and preventing leakage of a lubricating fluid.

The rotating member may include: a sleeve forming a bearing clearance between the shaft and the lower thrust member; and a rotor hub extending from the sleeve.

According to another aspect of the present invention, there is provided a hard disk drive, including: the spindle motor as described above rotating a disk when power is applied thereto through a substrate; a magnetic head recording data on the disk and reproducing data from the disk; and a head driving unit moving the magnetic head to a predetermined position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
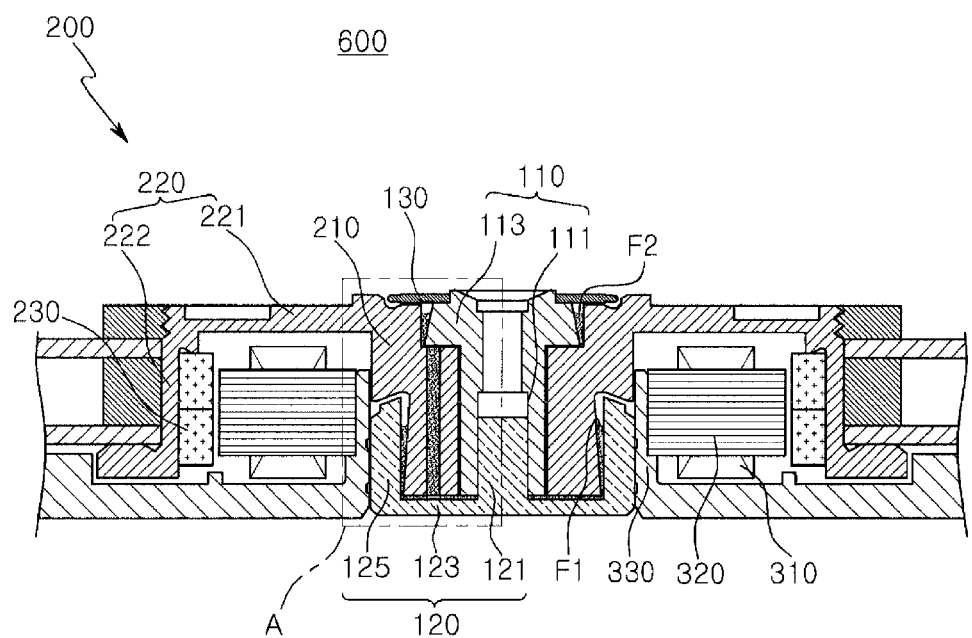
FIG. 1 is a schematic cross-sectional view of a spindle motor according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

First, terms with respect to directions will be defined. As viewed in FIG. 1, an axial direction refers to a vertical direction based on a shaft 110, and an outer radial direction or an inner radial direction may refer to a direction toward an outer circumferential surface of a rotor hub 220 based on the shaft 110 or a direction toward a center of the shaft 110 from the outer circumferential surface of the rotor hub 220.

Figure 2:
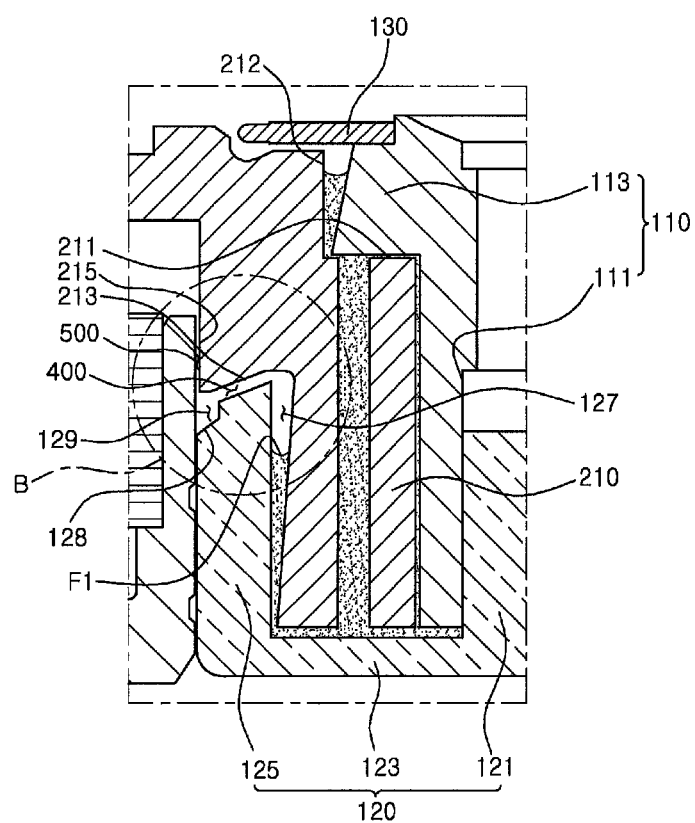
FIG. 2 is an enlarged cross-sectional view of part A of FIG. 1.
Figure 3:
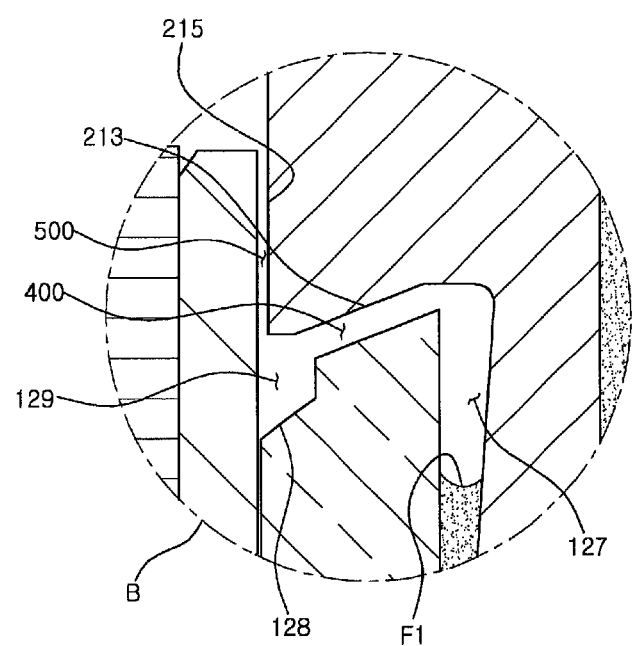
FIG. 3 is an enlarged cross-sectional view of part B of FIG. 2.
Figure 4:
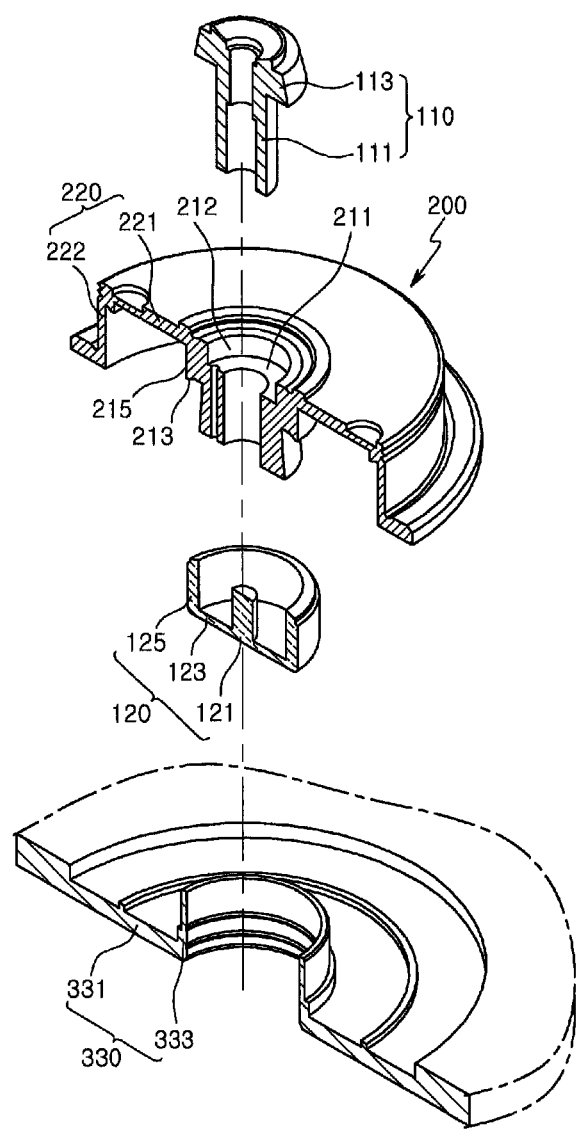
FIG. 4 is a cut-away perspective view of a shaft, a rotating member, a lower thrust member, and a base member according to the embodiment of the present invention.

FIG. 1 is a schematic cross-sectional view of a spindle motor according to an embodiment of the present invention, FIG. 2 is an enlarged cross-sectional view of part A of FIG. 1, and FIG. 3 is an assembled cross-sectional view of a shaft and a lower thrust member of the spindle motor according to an embodiment of the present invention. FIG. 4 is a cut-away perspective view of a shaft, a rotating member, a lower thrust member, and a base member according to the embodiment of the present invention.

Referring to FIGS. 1 to 4, a spindle motor 600 according to the embodiment of the present invention may include a shaft 110, a lower thrust member 120, a base member 330, a rotating member 200, a first sealing part, and a second sealing part.

In this configuration, the shaft 110 and the lower thrust member 120 may configure a fixed member, along with a base member 330.

That is, the base member 330 may be a fixed member that supports a rotation of the rotating member 200.

In this configuration, the base member 330 may form a predetermined space, along with the rotating member 200, and the space may be provided with a core 320 around which a coil 310 is wound.

Specifically, the base member 330 may include a body part 331 and a coupling part 333 extending upwardly in the axial direction from the body part 331, and the core 320 having the coil 310 wound therearound may be fixed to an outer circumferential surface of the coupling part 333.

The base member 330 may be manufactured by a die-casting method using aluminum (Al) as a material, and may be manufactured by plastic working (for example, pressing) a steel sheet.

The shaft 110 may be indirectly fixed to the base member 330 via the lower thrust member 120 and may configure the fixed member, along with the lower thrust member 120 and the base member 330.

The shaft 110 may be provided with a fixing groove 111 into which a portion of the lower thrust member 120 is inserted.

That is, the fixing groove 111 is formed in a lower portion of the shaft 110 to be recessed upwardly in the axial direction, and a portion of the lower thrust member 120 may be inserted into the fixing groove 111 and be fixed thereto by at least one of press-fitting, welding, and bonding methods.

Meanwhile, a flange part 113 may be provided on an upper portion of the shaft 110 to be extended in the outer radial direction.

The flange part 113 may be received in a receiving groove 211 provided in the rotating member 200 and may form a bearing clearance with the rotating member 200.

A bottom surface of the flange part 113 may be provided with a thrust dynamic pressure part (not illustrated) generating thrust dynamic pressure so that the rotating member 200 may rotate more stably.

However, the present invention is not limited thereto, and the thrust dynamic pressure part (not illustrated) may be formed in a surface of the rotating member 200 opposed to the bottom surface of the flange part 113.

Meanwhile, a second liquid-vapor interface F2 may be formed between an outer circumferential surface of the flange part 113 and an inner wall 212 forming the receiving groove 211. In order to form the second liquid-vapor interface F2, at least one of the outer circumferential surface of the flange part 113 and the inner wall 212 forming the receiving groove 211 may be tapered.

An upper surface of the flange part 113 may be stepped so as to fix a cover part 130.

The cover part 130 is fixed to the step part in which the upper surface of the flange part 113 is stepped, thereby suppressing leakage and evaporation of a lubricating fluid.

However, the cover part 130 is not necessarily fixed to the upper surface of the flange part 113, but may be fixed to an upper surface of the rotating member 200.

The lower thrust member 120 may form a first liquid-vapor interface F1, along with a sleeve 210 of the rotating member 200, and may configure a fixed member by being coupled to the shaft 110.

The lower thrust member 120 may include a fixing part 121 inserted into the fixing groove 111, a disk part 123 extending from the fixing part in the outer radial direction 121, and an extension part 125 extending in the axial direction from an end of the disk part 123.

An outer circumferential surface of the extension part 125 may be coupled to an inner circumferential surface of the coupling part 333 of the base member 330 by at least one of welding, bonding, and press-fitting methods.

Further, at least one of an upper surface of the disk part 123 of the lower thrust member 120 and a bottom surface of the sleeve 210 of the rotating member 200 may be provided with a thrust dynamic pressure part (not illustrated) generating thrust dynamic pressure.

That is, the thrust dynamic pressure is generated by the thrust dynamic pressure part (not illustrated) formed in the lower thrust member 120 at the time of rotation of the rotating member 200, so that the rotating member 200 may rotate more stably.

The rotating member 200 may rotatably mounted via the lubricating fluid while keeping the bearing clearance from the shaft 110 as described above, and may have a recording medium mounted thereon.

The rotating member 200 may include the sleeve 210 forming the bearing clearance from the fixed member and the rotor hub 220 extending from the sleeve 210.

The sleeve 210 and the rotor hub 220 may be separately formed and be coupled to each other to configure the rotating member 200, but in the spindle motor 600 according to the embodiment of the present invention, the sleeve 210 may be formed integrally with the rotor hub 220 to configure the rotating member 200.

When the sleeve 210 is formed integrally with the rotor hub 220 to configure the rotating member 200, a repeatable run out (RRO) may be reduced to considerably reduce micro vibrations and significantly increase performance.

The sleeve 210 may be provided with at least one bypass passage that communicates the upper portion of the sleeve 210 with the lower portion thereof.

The bypass passage may disperse the pressure of the lubricating fluid to keep a balance, and allow air bubbles present in the lubricating fluid, and the like, to be discharged by circulation.

The sleeve 210 may be coupled to the shaft 110 and the lower thrust member 120 while keeping the bearing clearance from the shaft 110a and the lower thrust member 120.

Further, an inner circumferential surface of the sleeve 210 may be provided with a radial dynamic pressure part (not illustrated) generating fluid dynamic pressure via the lubricating fluid filled in the bearing clearance at the time of rotation of the sleeve 210.

However, the radial dynamic pressure part (not illustrated) is not necessarily formed in the inner circumferential surface of the sleeve 210, but may be formed in an outer circumferential surface of the shaft 110.

The sleeve 210 has a through hole formed at a center thereof to allow the shaft 110 to be inserted into the through hole, and the upper portion of the sleeve 210 may be provided with the receiving groove 211 so as to receive the flange part 113 of the shaft 110.

Meanwhile, the first liquid-vapor interface F1 may be formed between the outer circumferential surface of the sleeve 210 of the rotating member 200 and the inner circumferential surface of the extension part 125 of the lower thrust member 120.

In this case, at least one of the outer circumferential surface of the sleeve 210 and the inner circumferential surface of the extension part 125 may be inclined to form the first liquid-vapor interface F1.

That is, the first liquid-vapor interface F1 may be formed between the outer circumferential surface of the sleeve 210 and the inner circumferential surface of the extension part 125 and be formed upwardly in the axial direction.

Further, the second liquid-vapor interface F2 may be formed between the outer circumferential surface of the flange part 113 and the inner wall 212, and may be formed upwardly in the axial direction, like the first liquid-vapor interface F1.

Herein, the bearing clearance is described in detail. The bearing clearance may be formed by allowing the inner circumferential surface of the sleeve 210 and the outer circumferential surface of the shaft 110 to have a predetermined interval therebetween, and the bearing clearance may also be formed by allowing the upper surface of the sleeve 210 and the flange part 113 to have a predetermined interval therebetween, and allowing the bottom surface of the sleeve 210 and the lower thrust member 120 to have a predetermined interval therebetween.

The bearing clearances may be connected to each other and may be filled with the lubricating fluid.

Meanwhile, a first space 127 may be formed above the first liquid-vapor interface F1.

The first space 127 may be formed between the outer circumferential surface of the sleeve 210 and the inner circumferential surface of the extension part 125.

That is, the first space 127 may contact the first liquid-vapor interface F1.

Herein, at least one of the outer circumferential surface of the sleeve 210 and the inner circumferential surface of the extension part 125 is inclined, such that the clearance between the outer circumferential surface of the sleeve 210 and the inner circumferential surface of the extension part 125 is gradually increased upwardly in the axial direction. Thus, the first space 127 may be wider upwardly in the axial direction.

The rotor hub 220 may include a hub base 221 extending in the outer radial direction from the sleeve 210 and a magnet support part 222 extending in the axial direction from the hub base 221.

A magnet 230 having an annular ring shape may be mounted on an inner circumferential surface of the magnet support part 222, and the magnet 230 may be a permanent magnet that is alternately magnetized with an N pole and an S pole along a circumferential direction to generate a magnetic field having predetermined strength.

Further, the magnet 230 may be disposed to face the core 320 around which the coil 310 is wound, and may generate driving force so that the rotating member 200 may rotate by electromagnetic interaction between the magnet 230 and the core 320 having the coil 310 wound therearound.

That is, when power is supplied to the coil 310, the driving force capable of rotating the rotating member is generated by the electromagnetic interaction between the core 320 having the coil 310 wound therearound and the magnet 230, and therefore the rotating member 200 may rotate based on the shaft 100.

A first sealing part 400 may be formed between the upper surface of the extension part 125 and the rotating member 200.

Specifically, the first sealing part 400 may be formed between the upper surface of the extension part 125 and a surface 213 of the rotating member 200 opposed to the upper surface of the extension part 125.

Further, the first sealing part 400 may be inclined upwardly in the inner radial direction.

To enable this, at least one of the upper surface of the extension part 125 and the surface 213 of the rotating member 200 opposed to the upper surface of the extension part 125 may be inclined upwardly in the inner radial direction.

Since the first sealing part 400 is inclined upwardly in the inner radial direction, a length of the first sealing part 400 may be considerably increased, whereby a sealing effect may be significantly improved.

A second sealing part 500 may be formed between the coupling part 333 of the base member 330 and the rotating member 200.

Specifically, the second sealing part 500 may be formed between the inner circumferential surface of the coupling part 333 and a surface 215 of the rotating member 200 opposed to the inner circumferential surface of the coupling part 333.

Therefore, a predetermined clearance for forming the second sealing part 500 is formed between the inner circumferential surface of the coupling part 333 and the surface 215 of the rotating member 200. To enable this, the surface 215 of the rotating member 200 opposed to the inner circumferential surface of the coupling part 333 may be disposed in the inner radial direction with respect to the outer circumferential surface of the extension part 125 of the lower thrust member 120.

The first sealing part 400, the second sealing part 500, and the first space 127 may be connected to communicate with one another.

The sizes of the clearances between the first sealing part 400 and the first space 127 and between the second sealing part 500 and the first space 127 are formed differently to cause a pressure reduction and energy loss, whereby foreign objects may be prevented from being introduced into the bearing clearance and the lubricating fluid may be prevented from leaking to the outside by being separated from the first liquid-vapor interface F1.

That is, a labyrinth seal may be formed by the first sealing part 400 and the second sealing part 500.

Here, a second space 129 may be formed between the first sealing part 400 and the second sealing part 500.

An end portion of the upper surface of the extension part 125 in the outer radial direction may be provided with a step part 128 formed by being recessed downwardly in the axial direction.

The size of the clearance between the inner circumferential surface of the coupling part 333 and the outer circumferential surface of the extension part 125 is increased due to the step part 128, such that the second space 129 may be formed.

As compared with the first and second sealing parts 400 and 500, the second space 129 may have a relatively wide clearance to considerably increase a pressure reduction effect, whereby a sealing effect may be improved.

Further, a reduction in the lubricating fluid may be prevented by preventing air included in the evaporated lubricating fluid from leaking to the outside by the first and second sealing parts 400 and 500 having a relatively small clearance.

Here, a volume of the second space 129 may be smaller than that of the first space 127.

Figure 5:
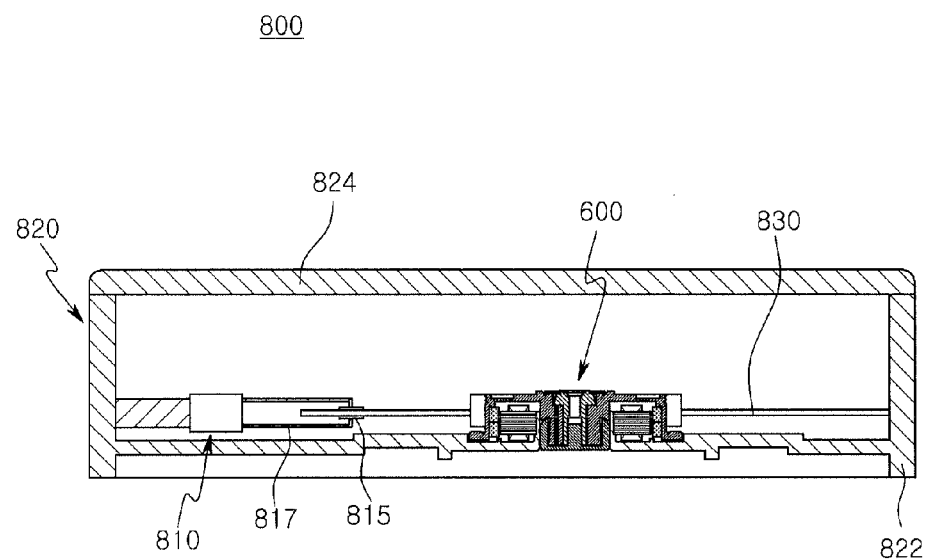
FIG. 5 is a schematic cross-sectional view of a disk driving apparatus using a motor according to an embodiment of the present invention.

FIG. 5 is a schematic cross-sectional view of a disk driving apparatus using a motor according to an embodiment of the present invention.

Referring to FIG. 5, a recording disk driving apparatus 800 having the motor according to the embodiment of the present invention mounted therein is a hard disk driving apparatus, and may include the spindle motor 600, a head driving unit 810, and a housing 820.

The spindle motor 600 has all the features of the spindle motor according to the embodiment of the present invention as described above and has a recording disk 830 mounted thereon.

The head driving unit 810 may transfer a magnetic head 815 to a surface of the recording disk 830 mounted on the spindle motor 600 and detect information from the surface of the recording disk 830.

Here, the magnetic head 815 may be disposed on a support part 817 of a magnetic head support part 810.

The housing 820 may include a motor mounting plate 822 and a top cover 824 shielding an upper part of the motor mounting plate 822 so as to form an internal space in which the spindle motor 600 and the head driving unit 810 are received.

As set forth above, a spindle motor and a hard disk drive including the same according to embodiments of the present invention can prevent foreign objects from being introduced and a lubricating fluid from leaking and improve the performance and lifespan of the spindle motor, by significantly increasing a labyrinth sealing effect.

While the present invention has been shown and described in connection with the embodiments, it will be apparent to those skilled in the art that modifications and variations can be made without departing from the spirit and scope of the invention as defined by the appended claims.

What is claimed is:

1. A spindle motor, comprising:
   a shaft having a fixing groove formed in a lower portion thereof;
   a lower thrust member including a fixing part inserted into the fixing groove, a disk part extending from the fixing part in an outer radial direction, and an extension part extending from the disk part in an axial direction;
   a base member coupled to the extension part;
   a rotating member forming a bearing clearance with the shaft and rotatably provided with respect to the shaft;
   a first sealing part provided between an upper surface of the extension part and the rotating member; and
   a second sealing part provided between an inner circumferential surface of the base member and an outer circumferential surface of the rotating member.

2. The spindle motor of claim 1, wherein the first sealing part is inclined upwardly in an inner radial direction.

3. The spindle motor of claim 1, wherein at least one of the upper surface of the extension part and a surface of the rotating member opposed to the upper surface of the extension part is inclined upwardly in an inner radial direction.

4. The spindle motor of claim 1, wherein a first liquid-vapor interface is formed between an inner circumferential surface of the extension part and the outer circumferential surface of the rotating member.

5. The spindle motor of claim 4, wherein a first space is formed above the first liquid-vapor interface in the axial direction.

6. The spindle motor of claim 5, wherein the first space is increased upwardly in the axial direction.

7. The spindle motor of claim 5, wherein a second space is formed between the first sealing part and the second sealing part.

8. The spindle motor of claim 7, wherein a volume of the second space is smaller than that of the first space.

9. The spindle motor of claim 1, wherein an end portion of the upper surface of the extension part in the outer radial direction is provided with a step part recessed downwardly in the axial direction.

10. The spindle motor of claim 1, wherein the base member includes:
    a body part; and
    a coupling part extending upwardly from the body part in the axial direction and coupled to the extension part.

11. The spindle motor of claim 10, wherein the second sealing part is formed between an inner circumferential surface of the coupling part and the rotating member.

12. The spindle motor of claim 10, wherein a surface of the rotating member opposed to the inner circumferential surface of the coupling part is disposed in an inner radial direction with respect to an outer circumferential surface of the extension part.

13. The spindle motor of claim 10, wherein an upper surface of the coupling part is disposed above the upper surface of the extension part in the axial direction.

14. The spindle motor of claim 1, wherein an upper portion of the shaft is provided with a flange part extending in the outer radial direction, and a second liquid-vapor interface is formed between an outer circumferential surface of the flange part and a surface of the rotating member opposed to the outer circumferential surface of the flange part.

15. The spindle motor of claim 14, wherein at least one of the outer circumferential surface of the flange part and the surface of the rotating member opposed to the outer circumferential surface of the flange part is tapered.

16. The spindle motor of claim 14, further comprising a cover part fixed to one of an upper surface of the flange part and an upper surface of the rotating member and preventing leakage of a lubricating fluid.

17. The spindle motor of claim 1, wherein the rotating member includes:
   a sleeve forming a bearing clearance between the shaft and the lower thrust member; and
   a rotor hub extending from the sleeve.

18. A hard disk drive, comprising:
   the spindle motor of claim 1 rotating a disk when power is applied thereto through a substrate;
   a magnetic head recording data on the disk and reproducing data from the disk; and
   a head driving unit moving the magnetic head to a predetermined position above the disk.

* * * * *